(12) United States Patent
Krishna

(10) Patent No.: US 9,189,755 B2
(45) Date of Patent: Nov. 17, 2015

(54) AVAILABLE POWER ESTIMATOR

(75) Inventor: Ramakrishnan Krishna, Skjern (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 1016 days.

(21) Appl. No.: 13/321,932

(22) PCT Filed: Sep. 22, 2009

(86) PCT No.: PCT/EP2009/062231
§ 371 (c)(1),
(2), (4) Date: Nov. 22, 2011

(87) PCT Pub. No.: WO2010/139372
PCT Pub. Date: Dec. 9, 2010

(65) Prior Publication Data
US 2012/0078518 A1 Mar. 29, 2012

Related U.S. Application Data

(60) Provisional application No. 61/184,370, filed on Jun. 5, 2009.

(51) Int. Cl.
*G01W 1/00* (2006.01)
*F03D 1/00* (2006.01)
*G06Q 10/04* (2012.01)
*G06Q 50/06* (2012.01)

(52) U.S. Cl.
CPC ............... *G06Q 10/04* (2013.01); *G06Q 50/06* (2013.01); *Y02E 10/70* (2013.01); *Y02E 10/72* (2013.01); *Y02E 10/721* (2013.01); *Y02E 10/723* (2013.01)

(58) Field of Classification Search
CPC ........ G06Q 50/06; G06Q 10/04; Y02E 10/70; Y02E 10/72; Y02E 10/721; Y02E 10/723
USPC ............................ 702/3; 290/44; 416/147, 61
See application file for complete search history.

(56) References Cited

U.S. PATENT DOCUMENTS

| 7,304,400 B2 | 12/2007 | Hayashi |
| 2003/0185665 A1 | 10/2003 | Hansen |

(Continued)

FOREIGN PATENT DOCUMENTS

| CN | 1976210 A | 6/2007 |
| EP | 1939445 A2 | 7/2008 |

(Continued)

OTHER PUBLICATIONS

Yang, Zhenbin. Wind Energy Resource Appraisal Software for Wind Farm Site Selection., Meterological Science & Technology 2001 No. 3.*

(Continued)

*Primary Examiner* — Mohamed Charioui
*Assistant Examiner* — Yoshihisa Ishizuka

(57) ABSTRACT

A method of determining an estimated wind speed of a wind driving a wind turbine includes measuring a current power generated by the wind turbine, measuring a current rotor speed of a rotor of the wind turbine, and measuring a current blade pitch angle of a rotor blade of the rotor. Moreover, the method includes determining the estimated wind speed based on the current power, the current rotor speed and the current blade pitch angle.

10 Claims, 6 Drawing Sheets

(56) References Cited

U.S. PATENT DOCUMENTS

| | | | | |
|---|---|---|---|---|
| 2007/0109301 | A1* | 5/2007 | Smith | 345/440 |
| 2008/0140263 | A1* | 6/2008 | Wang et al. | 700/291 |
| 2008/0291478 | A1* | 11/2008 | Shibuya et al. | 358/1.9 |
| 2009/0218818 | A1* | 9/2009 | Cardinal et al. | 290/44 |
| 2010/0078939 | A1* | 4/2010 | Kammer et al. | 290/44 |
| 2010/0237617 | A1* | 9/2010 | Vyas et al. | 290/44 |

FOREIGN PATENT DOCUMENTS

| | | | |
|---|---|---|---|
| EP | 2056210 A2 | | 5/2009 |
| WO | WO 2007123552 A1 | * | 11/2007 |
| WO | WO 2008023990 A1 | * | 2/2008 |

OTHER PUBLICATIONS

Nkemdirim L.C., "An Empirical Relationship between Temperature, Vapour Pressure Deficit and Wind Speed and Evaporation During a Winter Chinook". Theoretical and Applied Climatology 43, 123-128 (1991).*

Yang et al; "Software for Wind Energy Resource Assessment for Site Selection of a Wind Farm"; Meteorological Science and Technology; pp. 54-57; 2001; Dec. 31, 2001.

"Statement in accordance with the Notice from the European Patent Office dated Oct. 1, 2007 concerning business methods", pp. 592-593, XP007905525.

* cited by examiner

AVAILABLE POWER ESTIMATOR

CROSS REFERENCE TO RELATED APPLICATIONS

This application is the US National Stage of International Application No. PCT/EP2009/062231filed Sep. 22, 2009, and claims the benefit thereof. The International Application claims the benefits of U.S. Provisional Application No. 61/184,370 US filed Jun. 5, 2009. All of the applications are incorporated by reference herein in their entirety.

FIELD OF INVENTION

The present invention relates to a method of determining an estimated wind speed of a wind driving a wind turbine and an estimating device for determining an estimated wind speed of a wind driving a wind turbine. Further, the present invention relates to a wind turbine and a wind farm arrangement. Moreover, the present invention relates to a computer program for processing an estimating device of a wind turbine.

ART BACKGROUND

Wind energy is increasingly recognized as a viable option for complementing and even replacing other types of energy sources such as for instance fossil fuels. In the early development of wind energy, the majority of wind turbines were constructed for operation at a constant speed. However, recently the trend is toward using variable-speed wind turbines to better capture available wind power. In most cases, wind turbine blade pitch angles can be adjusted to control the operation of the variable speed wind turbine.

When the electrical power, which is fed into an electricity network, is larger than the electrical power, which is extracted from the electricity network, the frequency of the whole electricity network will increase. This is based on the fact that the wind turbines, which are connected to the electricity network, cannot deliver all their generated power to the electricity network. As a consequence, the frequency of the produced alternating current (AC) of the generated electrical power will increase. Typically, such a behavior will be shown not only by one wind turbine but by a plurality of wind turbines of a wind turbine park. Therefore, a power imbalance, wherein the produced power is larger than the used power, may result in an overall increase of the frequency of the electricity network.

In order to avoid such frequency variations it is known to operate wind turbines with a reduced power set point such that the electrical power, which is fed into the electricity network, will be reduced and a power balance between the power being delivered to the electricity network and the power being removed from the electricity network can be achieved at least approximately. Such a reduction of the power set point may even be requested by legal regulations in order to guarantee a stable electricity network.

The reason why a wind turbine is operated with a reduced power set point is typically not in the sphere of influence of the operator of the wind turbine. Therefore, the operator of a wind turbine will typically receive a revenue, which is related to the available power production and not to the actual power production. Therefore, it is highly desirable for an operator of a wind turbine to always have a precise and a reliable knowledge about the available power production of its wind turbine(s). Of course, the available power production will strongly depend on the actual wind condition.

It is known to estimate the available power production of a wind turbine by measuring the wind speed for instance at the top of the wind turbine nacelle and, based on the measured wind speed, to calculate the available power production. The available power production may be taken from a power curve table for a wind turbine, wherein the graph in of the power curve indicates how large the electrical power production will be at different wind speeds. The power curve table is generated by a field measurement executed by e.g. the wind turbine producers and are standardized for each special type of wind turbine. This known procedure for estimating the available power production has the disadvantage that the results are typically not very precise due to an inaccurate measurement of the wind speed by the anemometer.

SUMMARY OF THE INVENTION

It is an object of the present invention to improve the accurateness for estimating an available power production of a down regulated wind turbine.

This object may be solved by a method of determining an estimated wind speed of a wind driving a turbine, by an estimating device for determining an estimated wind speed of a wind driving a wind turbine, by a wind turbine, by a wind farm arrangement and by a computer program for processing a wind turbine, in particular of determining estimated wind speed of a wind driving the wind turbine according to the independent claims.

According to a first aspect of the invention, a method of determining an estimated wind speed of a wind driving a wind turbine is provided. The provided method comprises measuring a current power being generated by the (down regulated) wind turbine, measuring a current rotor speed of a rotor of the wind turbine and measuring a current blade pitch angle of a rotor blade of the rotor. Moreover, the method comprises determining the estimated wind speed based on the current power, the current rotor speed and the current blade pitch angle.

Moreover, according to a further exemplary embodiment of the first aspect of the invention, it is provided an estimating device for determining an estimated wind speed of a wind driving a wind turbine. The estimating unit comprises an estimating unit and a processing unit. The estimating unit is adapted for receiving a first value indicative of a current power being generated by the (down regulated) wind turbine, a second value indicative of a current rotor speed of a rotor of the wind turbine and a third value indicative of a current blade pitch angle of a rotor blade of the rotor. The processing unit is adapted for determining the estimated wind speed based on the current power, the current rotor speed and the current blade pitch angle.

The term "current power" may denote the power that is generated by the wind turbine at a predetermined time point, in particular when the turbine is throttled and down regulated.

The current (actual) power (limited power) may differ from the available maximum power that a wind turbine could achieve under optimal blade pitch conditions. The wind turbine may produce the current power when the wind turbine is throttled or down regulated respectively. A down regulation and a throttling of the wind turbine may be achieved by changing the blade pitch angle, for instance.

The term "blade pitch angle" may define angle of the rotation of the blades around their longitudinal axis in order to pitch the blades by turning around the rotor blade around their longitudinal axis. The rotor blade may be turned out of the wind or into the wind in order to adjust the wind force acting on the rotor blades. By turning the rotor blades slightly out of the wind, the acting wind force onto the rotor blades is reduced and thus the power generation of the wind turbine is reduced as well. The pitch angle may be defined as the angle of a pitch actuator revolving around the blade axis. Rotation towards the shaft of the turbine may yield positive angles and rotation away from the shaft may yield negative angles.

The term "current rotor speed" may define the speed of the rotor of the wind turbine the time of measuring the rotor speed. In particular, the rotation of the main shaft of the wind turbine may be expressed by the rotor speed.

In conventional wind turbines, the available maximum power may be calculated by measuring the wind speed by an anemometer. Up to now, the measuring of the wind speed by anemometers, in particular of anemometers that are installed at the nacelle of a turbine, is not nearly as accurate as required. When measuring inaccurate wind speeds, the calculated available maximum power based on the measured wind speed is inaccurate as well. Hence, the network operator operating a down regulated wind farm, may not be able to determine the available maximum power which the wind farm may produce during a nominal run, in which nominal run the maximum power production may be achieved. The only way to measure the accurate available maximum power is to run at least one wind turbine with the best rotor speed and the best blade pitch angle in order to generate the available maximum power. Both methods of determining the available maximum power, either by measuring the wind speed or by running the wind turbine at the available maximum power, are not nearly as accurate as required with respect to accuracy and time requirements.

By the present invention an accurate method for determining the maximum achievable wind power at the point where the wind turbine operates in a down-regulated and throttled status is provided. By the inventive method, the wind speed may not be measured but may be estimated based on the current power, the current rotor speed and the current blade pitch angle. Thus, the estimated wind speed may be more accurate than a measured value for the wind speed, because the estimated wind speed is based on measurement values that may be measured accurate.

Hence, a more accurate determination of the maximum available power is achieved as well. Thus, the network operator is able to determine more exactly the maximum available power of a wind turbine or a wind turbine farm.

According to a further exemplary embodiment of the present invention, the method further comprises determining an available maximum power of the wind turbine based on the determined estimated wind speed and a power curve of the turbine, wherein the power curve indicates the available maximum power at different wind speeds.

The power curve is dedicated to one certain type of wind turbine. Particularly, the power curve of a turbine gives the maximum available power for a turbine at certain different wind speeds.

Generating power is about generating torque in a power generator of the wind turbine. When designing the rotors (main part of the turbine) the rotor blades are modeled in such a way to be able to harvest the maximum amount of power from the wind. This will in turn give the estimated power curve, which may be verified through field measurements. In other words, if the wind speeds, in particular the estimated wind speed, is known, the maximum available power may be metered from the power curve diagram. The more accurate the wind speed is determined, the more accurate the maximum available power generation may be determined.

According to a further exemplary embodiment, determining the estimated wind speed comprising using the formula:

$P=C_p(\lambda,\theta)*\pi*R/2*\rho*v^3$ $P=C_p(R*\omega_{rotor}/v(T,p),\theta)*\pi*R/2*\rho(T,p)*v(T,p)^3$ wherein
$\lambda$ is the tip speed ratio;
$\omega_{rotor}$ is the rotor speed, in particular the main shaft speed in revolutions per minute;
v is the wind speed, R is the rotor radius;
$\rho$ is the air density;
$\theta$ is the blade pitch angle;
p is the local meteorological, and
T is the temperature.

The formula describes the function between produced power and the current wind speed when the turbine is in operation. The turbine available power may be calculated using the above-described formula. Thereby, $\lambda$, R, $\rho$, p and T may be standardized, so that the current power of the turbine is in particular dependent on the rotor speed, the blade pitch angle and the wind speed. That is, that when the current power, the current rotor speed and the current blade pitch angle may be accurately measured, e.g. by sensors, the actual estimated wind speed may be determined and calculated by using the formula described above. Additionally, variations from the standardized parameters, e.g. the temperature and ambient pressure, may be used, so that a more accurate wind speed estimate may be given by the current atmospheric conditions.

With this calculated estimated wind speed, the available maximum power may be metered from the power curve. Because the calculated and estimated wind speed may be more accurate than the measured wind speed, a more accurate determination of the maximum available power may be achieved.

According to a further exemplary embodiment, determining the estimated wind speed comprises defining a three-dimensional reference look-up table comprising three orthogonal axes, wherein the first axis denotes a rotor speed, the second axis denotes a wind speed and the third axis denotes blade pitch angle. The values in the three-dimensional reference look-up table denote a power being generated by the wind turbine dependent on the wind speed, the rotor speed and the blade pitch angle. The reference look-up table may also be called Cp look-up table.

The definition of a three-dimensional reference look-up table may simplify the determination of a maximum available power generated by a wind turbine. Thus, when measuring the current measured variables, such as the current power, the current rotor speed and the current blade pitch angle, a simple determination of the estimated wind speed may be metered from the reference look-up table without the need of calculating the estimated wind speed. Thus, it may be not necessary to use calculation devices such as a computer for determining the maximum available power. Moreover, from the reference look-up table is may be metered in an easy way how the maximum available power and the estimated wind speed would change when some variables, such as the current power, the current rotor speed and the current blade pitch angle would change. Thus, in particular, such a simplified and easy definable reference look-up table is generatable by standardizing the standardized values for $\lambda$, R, $\rho$, p and calculating the power production based on different working points, which give values for the variables wind speed, pitch angle and rotor speed.

According to a further exemplary embodiment of the invention, determining the established wind speed further comprises looking up the estimated wind speed in the reference look-up table for the current power, the current blade pitch angle and the current rotor speed.

According to a further exemplary embodiment, determining the estimated wind speed further comprises interpolating a value for the measured current power, the measured current blade pitch angle and/or the measured current rotor speed when the respective measured current value falls between two corresponding values in the reference look-up table. In particular, if for instance the step size of the pitch angle in the reference look-up table is 10, then corresponding values for the wind speed and the rotor speed are defined for instance for a blade pitch angle of 10° degree, 20° degree, 30° degree. When a blade pitch angle of 25° is measured for example, the value for the current rotor speed, the current power and the estimated wind speed may be interpolated for achieving an adjusted value in the reference look-up table.

According to a further exemplary embodiment, the method further comprises correcting the blade pitch angle in the reference look-up table, wherein the correcting comprises a calibration cycle. The calibration cycle comprises the measuring of the available maximum power of the wind turbine (i.e. the unlimited power production of the wind turbine) and thereby determining the estimated wind speed dependent on the measured available maximum power. Next, after derating the power production of the turbine until the wind turbine produces again a limited power, the current blade pitch angle is measured and the calculated blade pitch angle is calculated at the limited power. Moreover, the correcting comprises a further calibration cycle. When a further available maximum power of the wind turbine at a further point in time is measured, the further calibration cycle may start. According to the further calibration cycle a further estimated wind speed is determined dependent on the measured further available maximum power. Next, after derating the power production of the turbine until the wind turbine produces again a further limited power, a further current blade pitch angle is measured and a further calculated blade pitch angle is calculated at the further limited power. On the basis of the results of the calibration cycles, a transfer function for determining a (value for a) calibrated and corrected blade pitch angle on the basis of a value of the blade pitch angle in the reference look-up table is modelled. The transfer function is generated (modelled) by polynomial regression (e.g. linear regression) on the basis of a) an offset between the measured current blade pitch angle and the calculated pitch angle and b) an offset between the further measured current blade pitch angle and the further calculated pitch angle. The transfer function is adapted for determining a corrected blade pitch angle in the reference look-up table.

The transfer function and the corresponding line for the blade pitch angle may be used to calibrate and to correct the entries of the blade pitch angles in the reference look-up table.

Polynomial regression will give a straight line or a parable, etc., that minimizes the squared offset between the measured blade pitch angle and the calculated blade pitch angle θt at a specific working condition or set point of the wind turbine. Hence, by the transfer function a line will be provided that will have a minimum error (minimum offset) regardless of the blade pitch angle that is measured for various set points of the wind turbine.

An error or offset of the measured current blade pitch angle varies depending of what other variables (e.g. limited power, estimated wind speed, rotor speed) are applied, so that an inconstant offset between the measured current blade pitch angle and the calculated blade pitch angle for different set points (working condition) with different variables (e.g. limited power, estimated wind speed, rotor speed) exists. Therefore the transfer function is modeled through polynomial regression (e.g. linear regression). In other words, the transfer function may be defined on the basis of at least two pairs of data, wherein each pair of data comprises a value for the calculated blade pitch angle and measured blade pitch angle for a specific set point. Each pair of blade pitch angles values comprises a measured current blade pitch angle and a calculated blade pitch angle, in particular under the same variables (e.g. limited power, estimated wind speed, rotor speed). The difference between the measured current blade pitch angles and the calculated blade pitch angle defines an offset, individual for each pair of blade pitch angles value. Taking the offsets (differences) and each pair of data into consideration, the transfer function may be defined e.g. by polynomial regression. Hence, the transfer function may define e.g. a line (or parable, etc.) that will have a minimum error (offset) for the blade pitch angles for working condition (set points) of the wind turbine, where no blade pitch angles are calculated or measured regardless of the current measured current blade pitch angles that defines the transfer function. In other words, the transfer function may be used to calibrate the entries of the blade pitch angles in the reference look-up table in order to achieve corrected values for the blade pitch angles under specific working conditions of the turbine.

When having a more accurate value for the blade pitch angles, a more accurate estimated wind speed value may be metered from the reference look-up table. When the wind turbine produces the determined limited power, the current blade pitch angle is measured. With the measured current blade pitch angle, the operator may apply the reference look-up table for determining the estimated wind speed, for instance. The improvement of the accuracy of the entries in the reference look-up table for the blade pitch angle is provided by defining the transfer function, wherein in the transfer function the corrected current blade pitch angle, the current limited power, the current wind speed and the constant rotor speed may be entered. The transfer function gives a calibrated and corrected blade pitch angle, wherein the calibrated blade pitch angle comprises a smaller error (offset) than an inaccurate measured current blade pitch angle would provide in comparison to the real blade pitch angle.

According to a further exemplary embodiment, the calculated blade pitch angle is calculated by the limited power the estimated wind speed and a predefined constant rotor speed.

According to a further exemplary embodiment the calibrating of the blade pitch angle in the reference look-up table further comprises the starting of an additional calibration cycle when the turbine is derated again from a further available maximum power, so that an additional measured blade pitch angle and an additional calculated pitch angle is determined (and thus an additional pair of date). The transfer function is then additionally generated by polynomial regression (e.g. linear regression) on the basis of the differences between c) the additional measured current blade pitch angle and the additional calculated pitch angle. The more additional calibration cycle may be provided, the more accurate the transfer function will be.

In particular, a self learning algorithm for independently improving the transfer function may be achieved. Every time when the wind turbine runs with the achievable maximum power and is derated to a limited power again, a new additional calibration cycle may be started as described above. At the end of such an additional calibration cycle a further additional measured current blade pitch angle and a further additional calculated pitch angle (an additional pair of data) is determined with which the transfer function is then additionally generated by polynomial regression on the basis of the differences (offset) between the further additional measured current blade pitch angle and the further additional calculated pitch angle. Hence, after a plurality of (additional) calibrating cycles an accurate transfer function is achieved. Thus, in other words, the present exemplary embodiment provides a generation of a self-learning and self-calibrating transfer function for improving the accuracy of any values for the blade pitch angle in the reference look-up table.

According to a further exemplary embodiment, derating the power production of the turbine to the limited power comprises derating the power production of the limited power by changing the current blade pitch angle. The changing of the current blade pitch angle in order to reduce the power production is a gentle and cost effective way of reducing the power, without using braking methods that causes abrasive wear, e.g. when installing frictional breaks at the turbine shaft.

According to a further exemplary embodiment, a wind farm arrangement is provided, wherein the wind farm arrangement comprises a plurality of wind turbines, wherein at least one of the wind turbines is an above-described wind turbine comprising the estimating device for determining an estimated wind speed of a wind driving a wind turbine. Thus, when determining an available maximum power by one wind turbine with the above-described estimation method, the determined values may be extrapolated for all wind turbines in the wind farm arrangement, so that the net operator may achieve a more accurate value of an available maximum power for the whole wind farm.

According to a further exemplary embodiment, a computer program for determining an estimated wind speed of a wind driving the wind turbine. The computer program, when being executed by a data processor, is adapted for controlling the above-described method of determining an estimated wind speed of a wind driving a wind turbine.

As used herein, reference to a computer program is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

By the present invention the estimated wind speed may be determined more accurate than measuring the wind speed physically, e.g. by an anemometer. When having a more accurate estimated wind speed, the available maximum power production of a wind turbine may be estimated more accurate. Thus, in particular a wind farm may be controlled with a "spinning power reserve" which means, that the current power production of the wind farm may be set to a predefined percentage of the wind farms available maximum power production. By the present estimation method, the available maximum power may be determined with a precision of plus or minus 5% in comparison to the real available maximum power of a wind farm.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
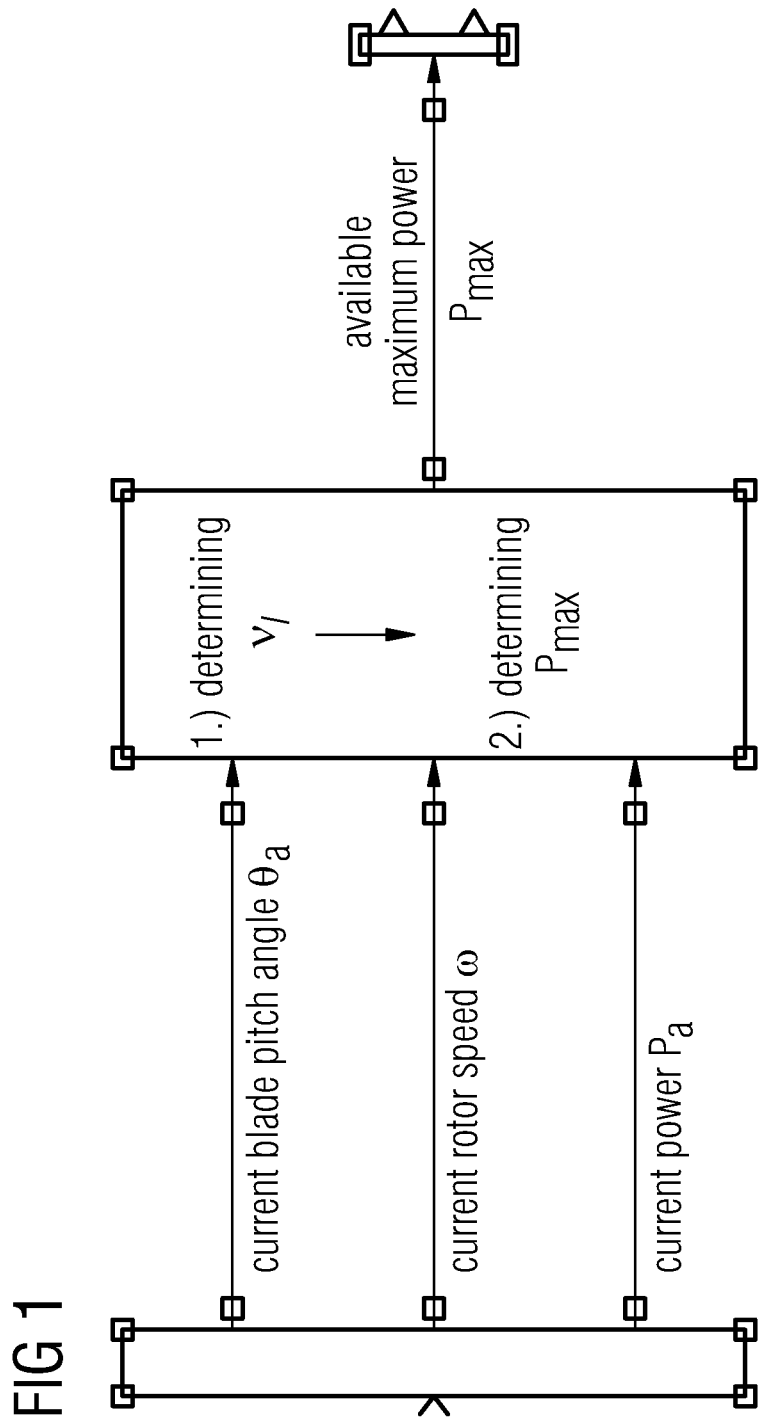
FIG. 1 illustrates a schematic description of the algorithm of the method according to an exemplary embodiment of the present invention.

The illustrations in the drawings are schematic. It is noted that in different figures similar or identical elements are provided with the same reference signs.

Figure 9:
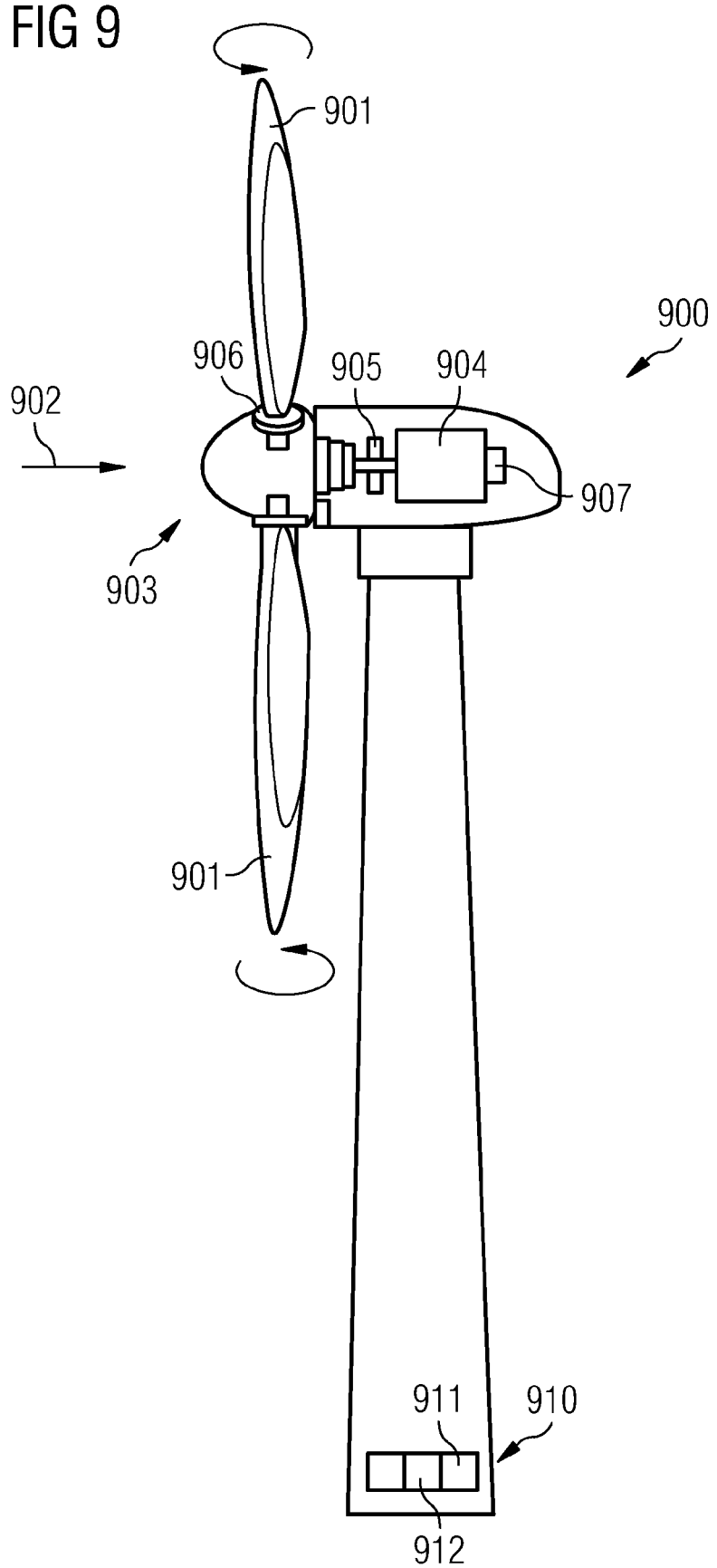
FIG. 9 shows a wind turbine with an estimating device according to an exemplary embodiment of the present invention.

FIG. 1 shows an exemplary embodiment of the method of determining an estimated wind speed ve of a wind driving a wind turbine 900 (see FIG. 9). The method comprising measuring a current power Pa being generated by the wind turbine 900, measuring a current rotor speed ωa of a rotor 903 (see FIG. 9) of the wind turbine 900 and measuring a current blade pitch angle θa of a rotor blade 901 (see FIG. 9) of the rotor 903. Based on the current power Pa, the current rotor speed ωa and the current blade pitch angle θa, the estimated wind speed ve may be determined.

As can be taken from FIG. 1, the determining of the estimated wind speed ve under step 1 may lead to a determination of the maximum available power Pmax under step 2, even when the wind turbine 900 is down-regulated, i.e. when the wind turbine 900 produces a reduced limited power Pl with respect to the available maximum power Pmax. The determination of the available maximum power Pmax may be achieved by taking the estimated wind speed ve and compare the estimated wind speed ve in a power curve diagram. From the power curve diagram different available maximum power values Pmax may be taken in comparison to different wind speeds v.

Figure 2:
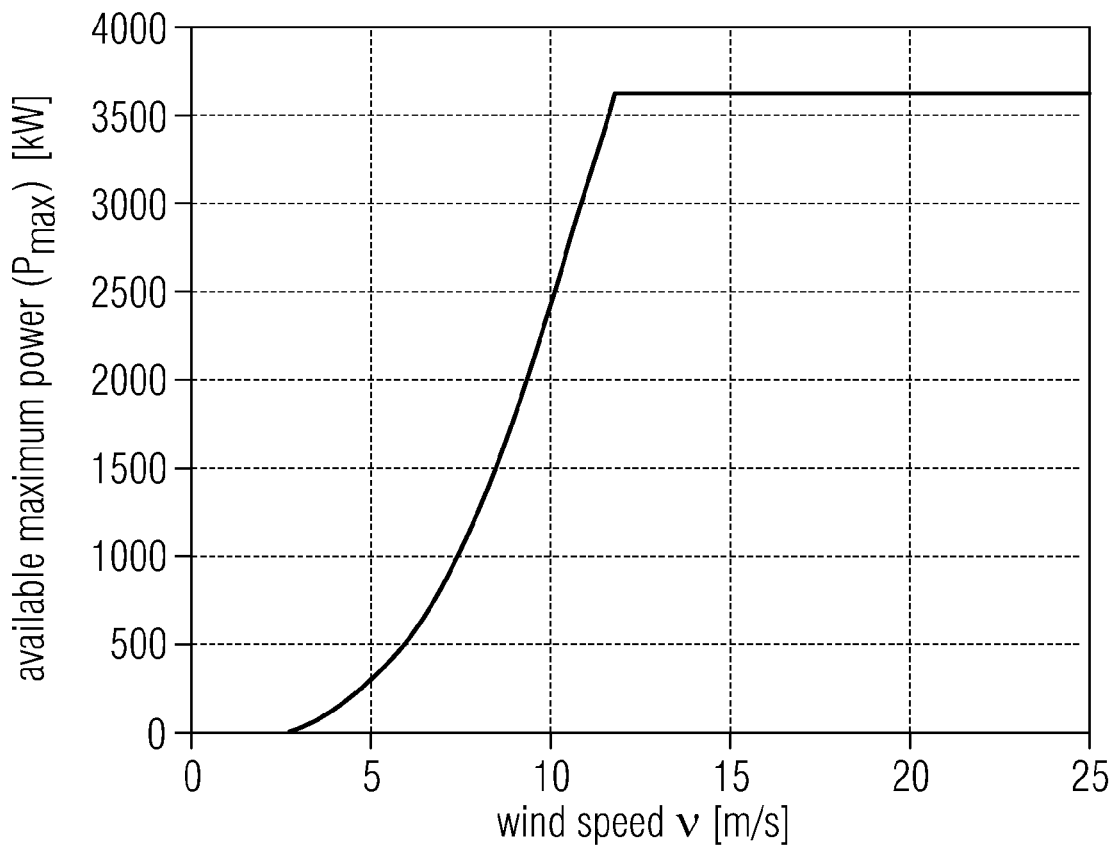
FIG. 2 shows a power curve diagram according to an exemplary embodiment of the invention.

FIG. 2 illustrates an example of a power curve diagram for a certain type of wind turbine. Each power curve may be verified by field measurements. Moreover, each power curve is dedicated to one certain type of wind turbine. The power curve gives the information which available maximum power Pmax may be generated by the certain type of turbine with respect to certain wind speeds v. Thus, when determining the estimated wind speed ve, a certain available maximum power value Pmax for a certain type of wind turbine 900 may be determined and metered by the power curve diagram as shown in FIG. 2.

Figure 3:
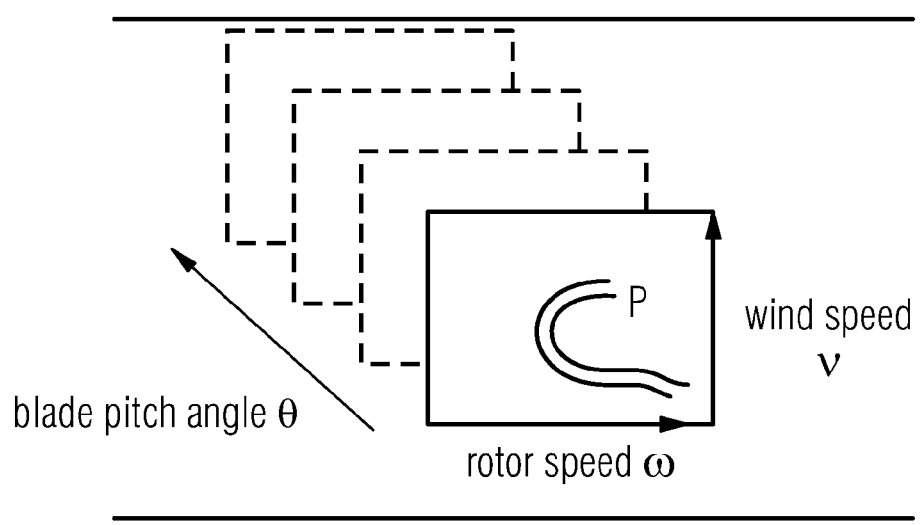
FIG. 3 shows a definition of a reference look-up table according to an exemplary embodiment of the invention.

FIG. 3 illustrates the relations between the blade pitch angle θ, the main shaft speed, respectively the rotor speed ω, the wind speed v and the generated power P.

The entries in the reference look-up table as shown in FIG. 3 may be based on the formula:

$$P=C_p(\lambda,\theta)*\pi*R/2*\rho*v^3$$

$$P=C_p(R*\omega_{rotor}/v(T,p),\theta)*\pi*R/2*\rho(T,p)*v(T,p)^3$$

wherein
λ is the tip speed ratio;
$\omega_{rotor}$ is the rotor speed, in particular the main shaft speed in revolutions per minute;
v is the wind speed, R is the rotor radius;
ρ is the air density;
θ is the blade pitch angle;
p is the local meteorological; and
T is the temperature.

The values of the rotor blade tip speed ratio λ, the rotor radius R, the air density ρ, the local meteorological pressure p and the temperature T may be standardized for all wind turbines 900 and fields of installation of the wind turbines 900, so that the actual power production P may be only dependent on the three variables rotor speed ω, the blade pitch angle θ and the wind speed v. In other words, when having or measuring the values for the blade pitch angle θ, the rotor speed ω and the measurable current limited power Pl an estimated wind speed ve may be estimated.

In order to simplify the step of determining the estimated wind speed ve it is possible to define a reference look-up table (CP-look-up table). The reference look-up table may be defined as a level function which is based on its input parameters. In the reference look-up table a power P for a variety of different variables of the blade pitch angle θ, the rotor speed ω and the wind speed v may be determined. In other words, a reference look-up table may be defined wherein the operator can meter in an easy and quick way the estimated wind speed v based on the current power Pa, the current rotor speed ωa and the current blade pitch angle θa. The operator needs not to calculate the estimated wind speed ve when having the measured values for the other variables. A simple look on the defined reference look-up table gives the operator a value for the estimated wind speed ve and thus a basis value for the available maximum power Pmax.

Figure 4:
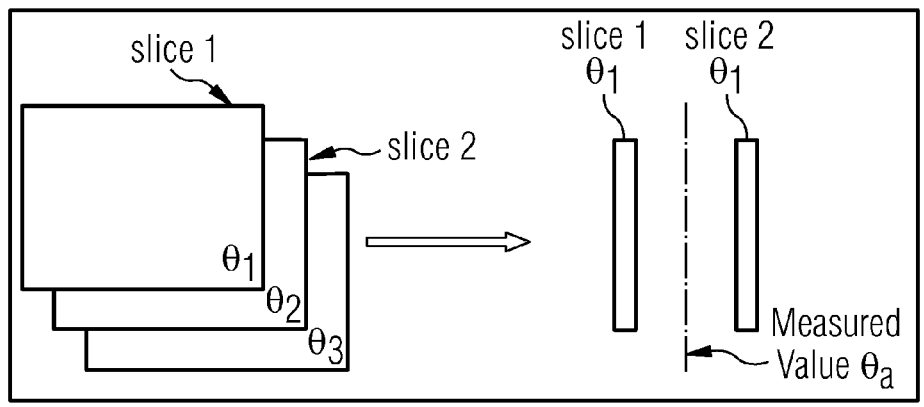
FIG. 4 shows an interpolation step of a measured value for the blade pitch angle according to an exemplary embodiment of the present invention.
Figure 5:
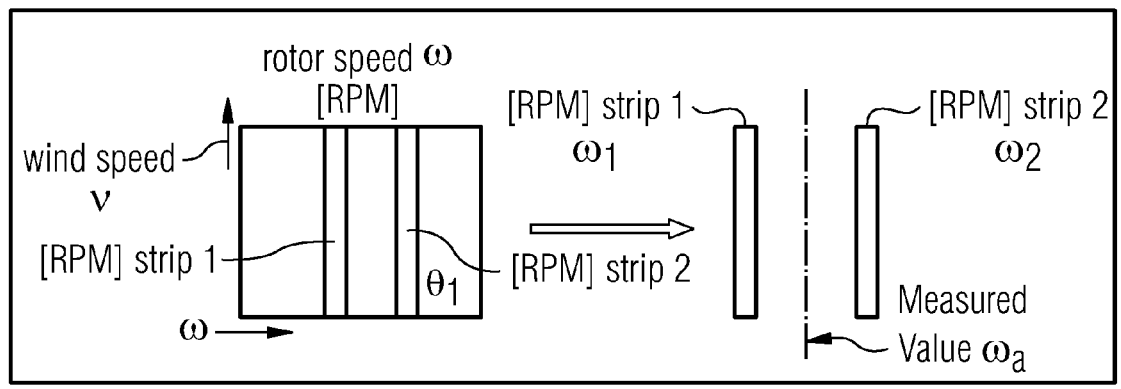
FIG. 5 shows a schematical view of an interpolation step between measured values for the rotor speed according to an exemplary embodiment of the present invention.

FIG. 4 and FIG. 5 illustrate examples of interpolating measured values within the reference look-up table. As can be seen in FIG. 4, if the current blade pitch angle θa falls between two entries in the table, e.g. θ1 and θ2, by use of a linear interpolation between the entries between the two blade pitch angles θ1, θ2 may define the respective values of the measured current blade pitch angles θa.

Moreover, as can be seen in FIG. 5 an interpolation between two entries in the reference look-up table for the rotor speed ω1, ω2 may be provided. When a measured value for the rotor speed ω falls between two entries of the rotor speed ω1, ω2 in the reference look-up table the corresponding values of the measured current rotor speed ωa may be interpolated. The interpolated values may be the interpolated power values P between the rotor speed value ω1 and ω2, for instance. This may be a power curve containing power values P along the column of the two-dimensional matrix of the reference look-up table, while each entry represent a power P corresponding to a certain wind speed value v. Thus, when using the current measured power Pa of the turbine, a likely wind speed ve is to be estimated using linear interpolation.

The acquired and estimated wind speed ve may directly be used for look-up on the power curve for the certain type of turbine which will return the wind turbines available maximum power Pmax.

Figure 6:
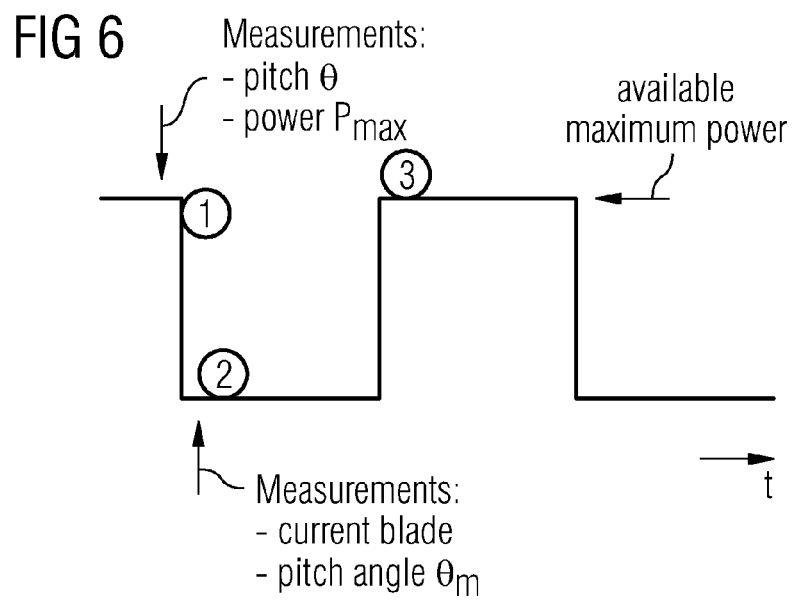
FIG. 6 shows an exemplary embodiment of the calibration step of the reference look-up table according to an exemplary embodiment of the present invention.

FIG. 6 illustrates a calibrating algorithm for the reference look-up table. When measuring an inaccurate value for the measured blade pitch angle θm of the wind turbine 900 the estimated maximum available power Pmax may be inaccurate as well. The values of the measured blade pitch angle θm may be inaccurate due to e.g. calibration errors of the wind turbine 900 and the sensors respectively. For example, an error of only 1° may result in a rather imprecise estimate of the estimated available maximum power Pmax. Therefore, an automotive and self-acting calibration algorithm may be provided, wherein with the calibration algorithm a transfer function may be defined with which the entries in the reference look-up table for the blade pitch angles θ may be corrected to achieve entries of corrected blade pitch angles θc.

In step 1 shown in FIG. 6 an available maximum power Pmax of the wind turbine 900 is measured, when the wind turbine 900 runs in a modus where the available maximum power Pmax is generated. When having the available maximum power Pmax the estimated wind speed ve may be metered from the power curve as shown in FIG. 2. Next, the wind turbine 900 will be down-regulated until a limited power Pl is generated. In step 2, the measured blade pitch angle θm when generating the limited power Pl may be measured. It may be assumed that the estimated wind speed ve is kept equal between step 1 and step 2, because the time for down-regulating the wind turbine 900 may take only 1 to 10 seconds, so that it is assumed that in this time period no wind speed changes occur.

The current rotor speed ωc is kept constant when generating the available maximum power Pmax and the limited power Pl (i.e. the rotor speed ωc is kept constant between step 1 and step 2). Thus, a two dimensional look-up table may be defined where each limited power Pl is based on the blade pitch angle θ and the wind speed v, as shown in FIG. 7.

Figure 7:
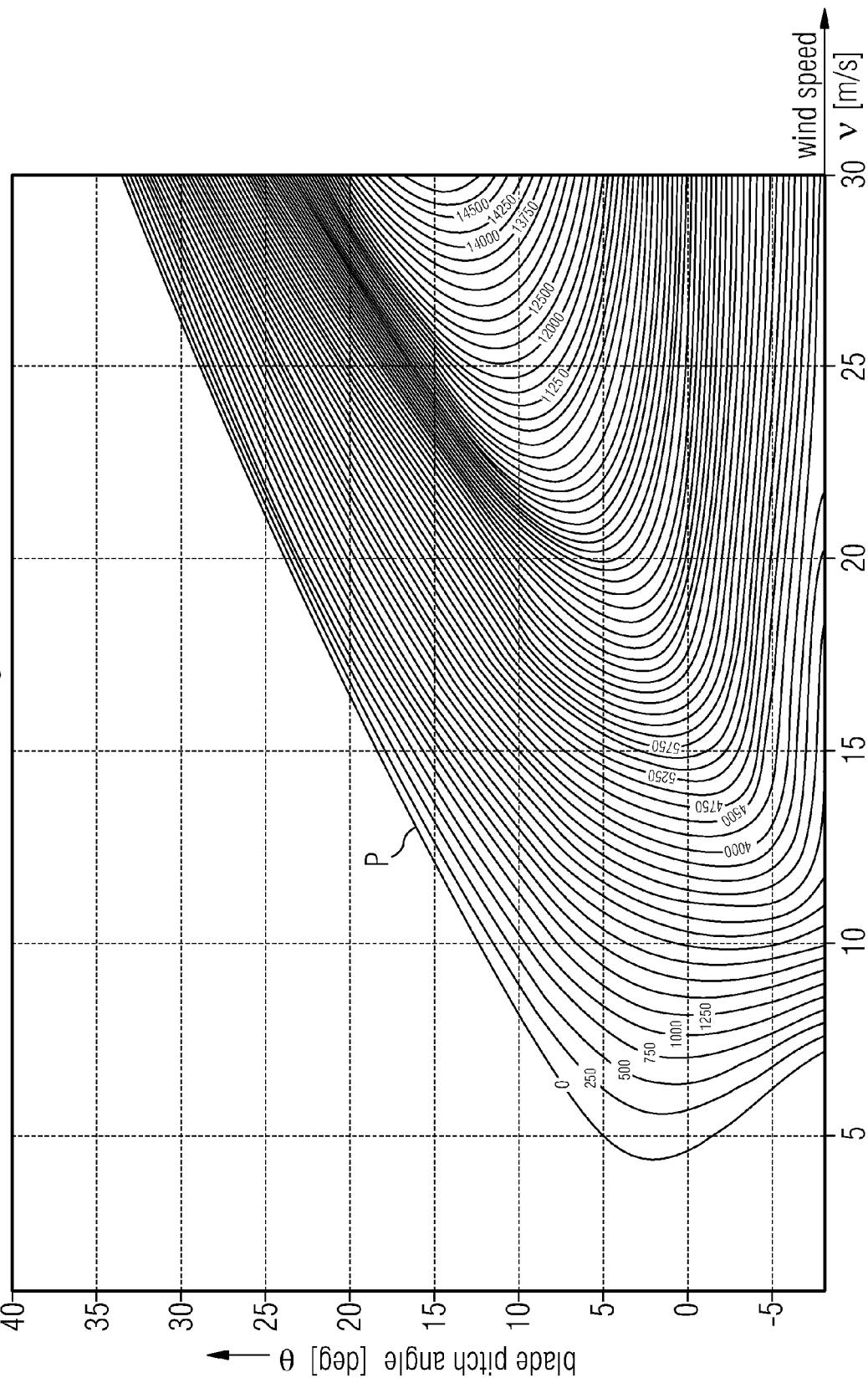
FIG. 7 shows a two-dimensional diagram indicating the generatable power for different wind speed and blade pitch angles according to an exemplary embodiment of the present invention.

FIG. 7 illustrates such a two dimensional look-up table where the generated power P is based on the blade pitch angles θ and the wind speed v. In FIG. 7, a two-dimensional diagram for an exemplary 3.6 MW (Megawatt) wind turbine 900 is shown. By keeping the rotor speed ωc constant between the production of the available maximum power (step 1 in FIG. 6) and the production of the limited power Pl (step 2 in FIG. 6), the two-dimensional diagram may be defined in which the produced power P depends on the blade pitch angle θ and the wind speed v, as shown in FIG. 7. The two-dimensional diagram may be defined as a level set function, wherein the different levels represent different power values P. Having the estimated wind speed ve and having the measured wind turbines limited power Pl, this two-dimensional diagram may be used to estimate the calculated blade pitch angle θt.

Summarizing, up to this point the calculated blade pitch angle et and the measured blade pitch angle θa for a specific set point (e.g. defined by limited power Pl production, wind speed v) is determined. Between both values, the calculated blade pitch angle θt and the measured blade pitch angle θm, an offset a generally occurs.

The offset between the measured blade pitch angle θm and the calculated blade pitch angle θt of the wind turbine 900 will most probably not provide a constant offset a, i.e. the added offset to the measured current blade pitch angle θm in order to achieve the corrected blade pitch angle θc will not be the same for the blade pitch angles θ for different working conditions (set points) of the wind turbine 900.

Therefore the modeling of the offset a between the measured blade pitch angle θm and the current blade pitch angle ea cannot be done sample to sample. Hence, a transfer function, which is in particular an analytical function, is needed that observes the behavior of the offset a with respect to different working conditions of the wind turbine 900. Thus, the transfer function models the offset a mathematically, so that the measured blade pitch angle θm may be corrected with the transfer function in order to achieve the corrected blade pitch angle θc. Thus, for different working conditions (e.g. different limited power Pl, different wind speeds v, different rotor speed ωc) of the wind turbine 900 a corrected blade pitch angle θc may be calculated by the transfer function.

Modeling of the transfer function will be based on an event of stepping down the power reference from the available maximum power Pmax to the limited power Pl. Until the power reference is stepped down the wind turbine 900 is harvesting all the energy in the wind, and is in nominal power production. Once stepped down the power production will be limited to a predefined power set point and the wind turbine 900 produces the limited power Pl. Next, the behavior of the measured blade pitch measurement θm compared to the calculated blade pitch angle θt may be observed and the offset a determined.

When the wind turbine 900 is in nominal power production (i.e. produces the maximum available power Pmax) the produced power Pmax will be directly dependant on the wind speed v. So at the sample interval (step 1 in FIG. 6) before the step down of power reference (step 2 in FIG. 6), the wind speed v may be estimated by a direct lookup in the power curve.

The estimated wind speed ve will not have changed significantly after we have stepped the power reference down from step 1 to step 2.

When the wind turbine 900 produces the limited power Pl the rotor speed ωc will be kept constant in comparison to the rotor speed ω at the nominal power production where the available maximum power Pmax is achieved. This is done in order to be able to quickly resume nominal power production in case of step up in power reference.

Hence, when the wind turbine 900 runs in the limited state, a constant rotor speed ωc, and estimate of the wind speed ve and a limited power production Pl is determined. Using these three factors the calculated blade pitch angle θt of the rotor blades 901 may be calculated.

Next, the calculated blade pitch angle θt may be compared with the measured blade pitch angle θm. It may be unlikely that these angles at first will be the same. So this gives a difference (offset a) at that specific pitch angle θ. In other words, calculated data (calculated blade pitch angle θt) and measured data (measured blade pitch angle θm) are determined that differ with a certain offset a.

When the turbine runs the next time with a available maximum power Pmax and is down regulated to produce a limited power Pl again, a further pair of data (corresponding calculated blade pitch angle θt and measured current blade pitch angle θm at a specific set point of the wind turbine 900) with a further specific offset a may be determined. When a sufficient number of pairs of data are obtained, the transfer function may be calculated.

Figure 8:
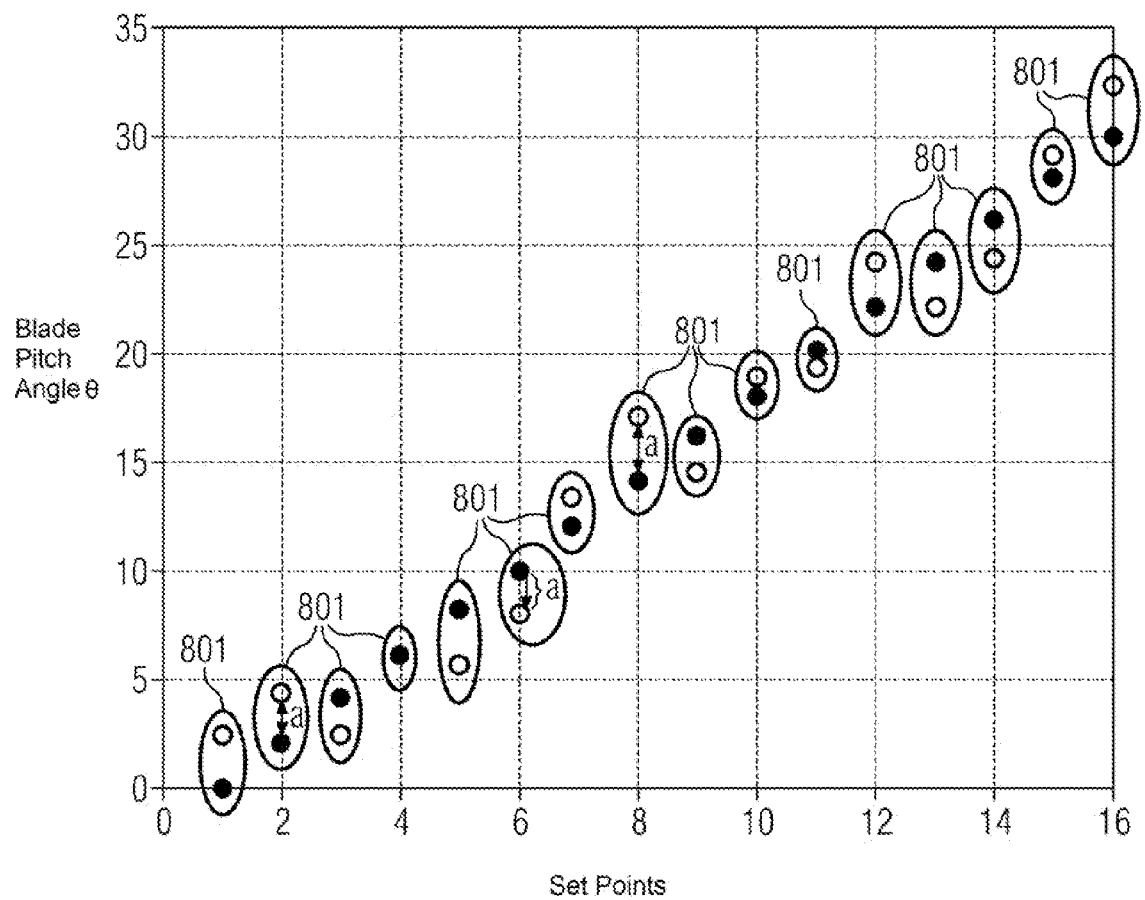
FIG. 8 shows a diagram comprising a plurality of pairs of data according to an exemplary embodiment of the present invention.

FIG. 8 shows a diagram of pairs of data 801 that may be determined. The unfilled dots show the measured blade pitch angle θm plotted against the corresponding calculated blade pitch angle θt (filled dots in vertical direction). If the measured blade pitch angle θm would be ideal, the offset a would be zero and the filled and unfilled dots would overlay, so that a straight line would connect all unfilled dots.

As shown in FIG. 8, the offset a varies depending of what blade pitch angle θ for specific set point of the wind turbine 900 is determined, so that the offset a is inconstant. Therefore the transfer function is modeled, in particular by polynomial regression.

Polynomial regression will give a straight line (or a parable, etc.) that minimizes the squared distance (offset a) between the unfilled dots (measured blade pitch angle θm) and the filled dots (calculated blade pitch angle θt). Hence, a line will be provided by the transfer function that will have a minimum error (minimum offset a) regardless of the blade pitch angle θ that is measured for various set points of the wind turbine 900.

The transfer function and the corresponding line for the blade pitch angle θ may then be used to calibrate the blade pitch angles θ in the reference look-up table.

In order to model a more accurate transfer function several events and thus several pairs of data may be helpful. An event comprises the running of the wind turbine 900 under nominal power (where the available maximum power Pmax is generated) and the running in a limited stat (where the limited power Pl is generated). In other words, the calibration algorithm is event-based, wherein each event may be defined as a step of down-regulating the wind turbine 900. The available maximum power Pmax before and the limited power Pl after the down-regulation of the wind turbine 900 may be measured. Both measured values of the available maximum power Pmax and the down-regulated limited power Pl may be used to calculate the calculated blade pitch angle θt of the rotor blades 901. The more pairs of data are determined, the more accurate is the transfer function.

Coming back to FIG. 6, the calibration algorithm is a self-learning algorithm. In particular, over a certain time period t each time when the wind turbine 900 produces an available maximum power Pmax (see step 3 in FIG. 6), a further measurement is done, so that an estimated wind speed ve may be determined in the power curve diagram, shown in FIG. 2. When down-regulating the wind turbine 900, a further calibration cycle may be executed, so that in a subsequent down-regulated state of the wind turbine 900 a further measured blade pitch angle θm for a certain limited power Pl and estimated wind speed ve of the wind turbine 900 may be taken. The further measured blade pitch angle θm may be compared to the corresponding calculated blade pitch angle θc. This gives a new pair of data and a new value for the specific offset a. The more numbers of pairs of data blade pitch angle θ is determined, the more detailed is the transfer function, so that the calibration of the blade pitch angles θ in the reference look-up table is more accurate. Thus, the calibration step may be used as a training algorithm for all wind turbines 900 of a special kind in a wind farm and thereby continuously keep the individual reference look-up tables accurate for each wind turbine 900.

FIG. 9 illustrates an exemplary embodiment of a wind turbine 900 comprising rotor blades 901 that are mounted to a rotor 903. In a nacelle of the wind turbine 900 the power generator 904 is attached to the rotor 903 for generating the power P. Moreover, a rotor speed sensor 905, a blade pitch sensor 906 and a power sensor 907 are attached to the wind turbine 900 for measuring the respective values.

Moreover, the estimating device 910 is installed to the wind turbine 900, wherein the estimating device 910 may comprise the estimating unit 911 and the processing unit 912 in order to process the above-described method for estimating the wind speed ve of a wind driving the wind turbine 900.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS

801 pair of data
900 wind turbine
901 rotor blade
902 wind direction
903 rotor
904 power generator
905 rotor speed sensor
906 blade pitch sensor
907 power sensor
910 Estimating device
911 estimating unit
912 processing unit
Pmax available maximum power
Pa current power
Pl limited power
v wind speed
ve estimated wind speed
$\omega_{rotor}$ rotor speed
$\omega$a current rotor speed
$\omega$c constant rotor speed
$\theta$ blade pitch angle
$\theta$a current blade pitch angle
$\theta$t calculated blade pitch angle
$\theta$c corrected blade pitch angle
$\theta$m measured blade pitch angle
R rotor radius
$\rho$ air density
p local meteorological pressure
T temperature
t time

The invention claimed is:

1. A method of determining an estimated wind speed of a wind driving a wind turbine, comprising:
defining through operation of at least one processor a three dimensional reference look-up table comprising three orthogonal axes,
wherein a first axis denotes a rotor speed, a second axis denotes a wind speed and a third axis denotes a blade pitch angle, and
wherein values in the three dimensional reference look-up table denote a power being generatable by the wind turbine dependent on the wind speed, the rotor speed and the blade pitch angle,
measuring a current power generated by the wind turbine,
measuring a current rotor speed of a rotor of the wind turbine,
measuring a current blade pitch angle of a rotor blade of the rotor,
determining through operation of the at least one processor, an estimated wind speed based at least in part on the look-up table and the measurements of the current power, the current rotor speed and the current blade pitch angle, and
correcting the blade pitch angle in the reference look-up table, wherein the correcting comprises:
a calibration cycle, the calibration cycle comprising:
measuring an available maximum power of the wind turbine,
determining through operation of the at least one processor the estimated wind speed based upon the available maximum power,
derating a power production of the wind turbine until the wind turbine produces a limited power,
measuring the current blade pitch angle and calculating through operation of the at least one processor the calculated blade pitch angle at the limited power,
a further calibration cycle, the further calibration cycle comprising:
measuring a further available maximum power of the wind turbine at a further point in time,
determining through operation of the at least one processor a further estimated wind speed based upon the further available maximum power,
derating the power production of the wind turbine until the wind turbine produces a further limited power,
measuring the further current blade pitch angle and calculating through operation of the at least one processor a further calculated blade pitch angle at the further limited power,
modelling through operation of the at least one processor a transfer function based upon a value of the blade pitch angle in the reference look-up table,
wherein the transfer function is generated by polynomial regression based upon
a) an offset between the measured blade pitch angle and the calculated pitch angle, and
b) a further offset between the further measured blade pitch angle and the further calculated pitch angle,
wherein the transfer function is adapted for determining a corrected blade pitch angle in the reference look-up table.

2. The method of claim 1, further comprising:
through operation of the at least one processor, determining an available maximum power of the wind turbine based on the determined estimated wind speed and a power curve of the turbine,
wherein the power curve indicates the available maximum power at different wind speeds.

3. The method of claim 1, wherein determining the estimated wind speed further comprises:
looking-up through operation of the at least one processor the estimated wind speed in the reference look-up table for the current power, the current blade pitch angle and the current rotor speed.

4. The method of claim 1, wherein determining the estimated wind speed further comprises:

interpolating through operation of the at least one processor a value for the measured current power, the measured current blade pitch angle and/or the measured current rotor speed when the respective measured current value falls between two corresponding values in the reference look-up table.

5. The method of claim 1, wherein determining the estimated wind speed further comprises:
interpolating through operation of the at least one processor a value for the measured current power, the measured current blade pitch angle and/or the measured current rotor speed when the respective measured current value falls between two corresponding values in the reference look-up table.

6. The method of claim 1, wherein correcting the blade pitch angle in the reference look-up table further comprises:
starting an additional calibration cycle when the wind turbine is derated again from a further available maximum power, so that an additional measured current blade pitch angle and an additional calculated pitch angle are measured, and
wherein the transfer function is additionally generated through operation of the at least one processor by polynomial regression on the basis of
c) an additional offset between the additional measured blade pitch angle and the additional calculated pitch angle.

7. An estimating device for determining an estimated wind speed of a wind driving a wind turbine, comprising: at least one processor configured to carry out the method according to claim 1.

8. A wind turbine, comprising:
a measurement device configured to measure a current power, a current blade pitch angle and a current rotor speed, and
the estimating device, according to claim 7.

9. The method of claim 1, wherein the calculated blade pitch angle is calculated through operation of the at least one processor based on the limited power, the estimated wind speed and a predefined constant rotor speed.

10. The method of claim 9, wherein correcting the blade pitch angle in the reference look-up table further comprises:
starting an additional calibration cycle when the wind turbine is derated again from a further available maximum power, so that an additional measured current blade pitch angle and an additional calculated pitch angle are measured, and
wherein the transfer function is additionally generated through operation of the at least one processor by polynomial regression on the basis of
c) an additional offset between the additional measured blade pitch angle and the additional calculated pitch angle.

* * * * *